June 23, 1964 A. J. WILTSHIRE 3,138,507
FIBER REINFORCED PLASTIC ARTICLES
AND METHOD OF MAKING THE SAME
Filed June 15, 1961 4 Sheets-Sheet 1

INVENTOR.
ARTHUR J. WILTSHIRE
BY *Ely, Pearne & Gordon*

ATTORNEYS.

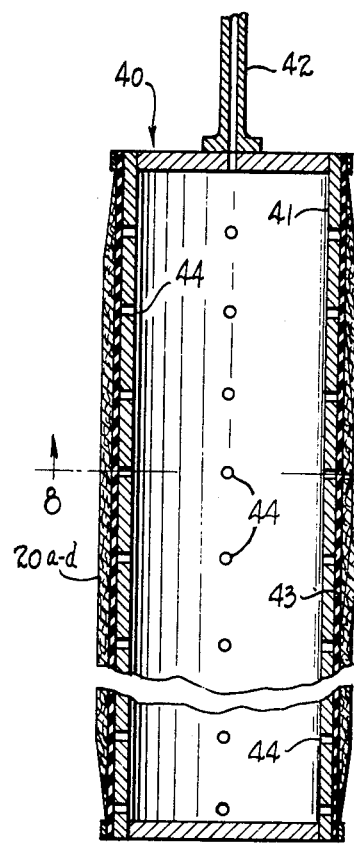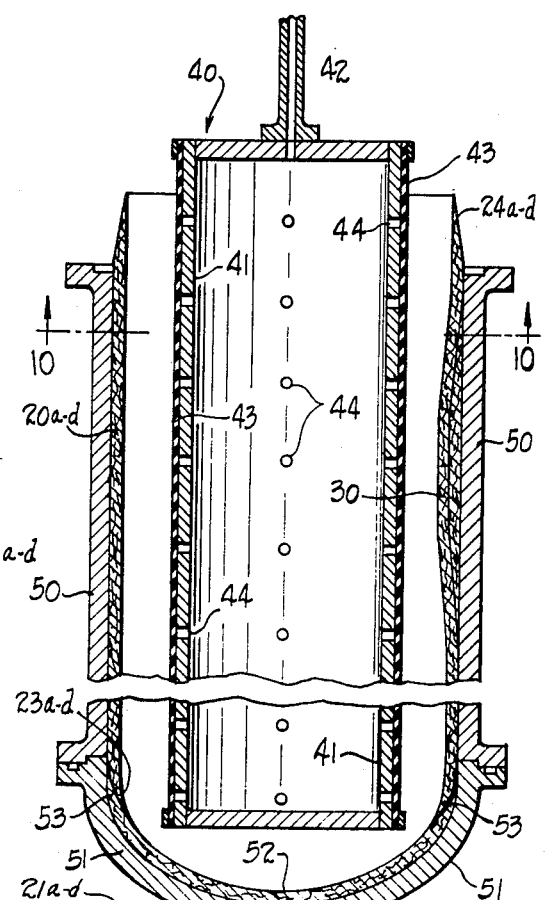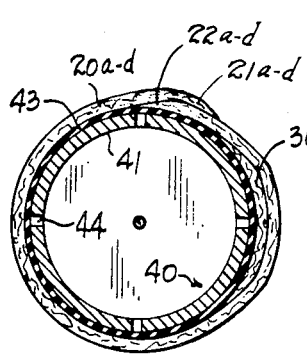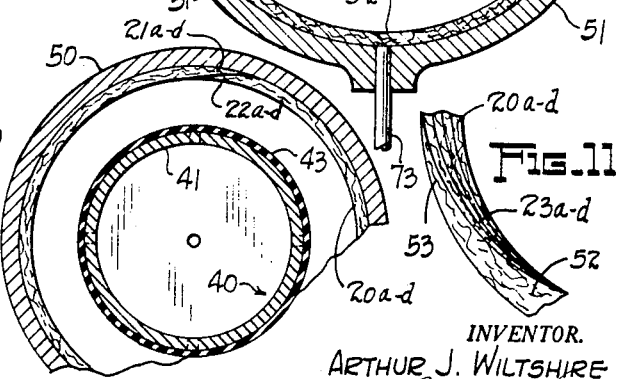

June 23, 1964

A. J. WILTSHIRE 3,138,507

FIBER REINFORCED PLASTIC ARTICLES
AND METHOD OF MAKING THE SAME

Filed June 15, 1961

INVENTOR.
ARTHUR J. WILTSHIRE
BY
ATTORNEYS.

June 23, 1964

A. J. WILTSHIRE 3,138,507

FIBER REINFORCED PLASTIC ARTICLES
AND METHOD OF MAKING THE SAME

Filed June 15, 1961

INVENTOR.
ARTHUR J. WILTSHIRE
BY
ATTORNEYS.

United States Patent Office 3,138,507
Patented June 23, 1964

3,138,507
FIBER REINFORCED PLASTIC ARTICLES AND
METHOD OF MAKING THE SAME
Arthur J. Wiltshire, Cleveland, Ohio, assignor to Structural Fibers, Inc., Chardon, Ohio, a corporation of Ohio
Filed June 15, 1961, Ser. No. 117,465
12 Claims. (Cl. 156—194)

The present invention relates generally to the manufacture of a wide variety of fiber-reinforced plastic articles, including molded pastic sheets, tubes, containers and the like, which are fabricated by laying up porous, fibrous matting approximately in the shape of the article to be produced and impregnating the layed-up fibrous matting with a liquid resin which is thereafter set or cured to produce a molded, substantially homogeneous fiber-reinforced structure. More specifically, this invention is concerned with the production of molded, fiber-reinforced, plastic, pressure vessels, such as domestic water softener tanks and hot water tanks, which are subjected to pressures of considerable magnitude and are thus required to have a high bursting strength.

Manufacturing procedures particularly adapted to the manufacture of articles of the type described are generally set forth in my copending application, Ser. No. 63,082, filed October 17,1960, and the present invention has for its main objective the provision of improvements in the methods there disclosed and in the performance of the seamless tanks produced thereby.

A more specific object of the present invention is to provide molded, fiber-reinforced, plastic tanks, which are characterized by a seamless, leakproof, substantially homogeneous and monolithic structure possessing unexpectedly improved strength.

Another object of the invention is to provide improved methods for fabricating and laying up porous, fibrous matting shapes in a manner which facilitates the subsequent molding of tanks having the improved characteristics set forth in the previous paragraph.

The manufacturing procedure described in my above-identified application includes the steps of wrapping flat sheets of matting a single turn around an expandable mandrel to form a cylindrical matting form. The flat sheets of matting have a length substantially equal to the circumference of the finally molded tank and have opposite end edges correspondingly feathered or beveled, each mat being wrapped around the mandrel so that one feathered end edge loosely overlaps the body of the mat adjacent the other feathered end edge.

Having laid-up the fibrous sheets or mats around the expandable mandrel in the foregoing manner, the mandrel is axially positioned within an open-end, cylindrical mold casing and then expanded to position and compresses the cylindrical matting form against the inner surface of the mold casing. As this expansion of the cylindrical matting form takes place, the overlapped ends of each mat are drawn apart until the feathered end edges slide into mating juxtaposition so that the fibers of the matting are uniformly distributed and compacted over the inner mold surface. Thereupon, the mandrel is contracted and removed from the mold casing and is replaced by an inflatable and expandable bag having an inflated shape generally conforming to the desired interior shape of the molded tank. Alternatively, the expandable mandrel can be left in place and used as a substitute for the inflatable bag.

When molding closed-end tanks, the next step, as disclosed in my above-identified application, has been to telescope preformed fiber matting end pieces into the opposite open ends of the positioned, cylindrical matting form. The open-end mold casing has then been closed by mold casing caps having the general external configuration of the preformed, fiber matting end pieces. With the matting forms and bag thus assembled within the closed mold, the bag is initially expanded to bring it into firm contact over its entire surface with the inner surface of the laid-up fiber form to hold the matting sections in place. Liquid resin is then introduced into the bottom of the mold in permeating relationship with the fiber matting forms. The bag is subsequently expanded by further inflation to progressively compress the fiber matting forms in such a manner as to distribute the resin throughout the matting and express air and excess resin from the mold, whereupon the resin is set or cured while maintaining the maximum bag pressure.

The foregoing method was developed as an improvement in a prior, generally similar method described and claimed in Re. No. 25,241 of Donald W. Randolph, granted September 11, 1962.

As also described in the above-mentioned Randolph Re. 25,241, it is customary to form the molded tanks with a thickened wall portion which may be drilled and tapped for connecting pipes and other fittings to the tanks. Such thickened wall portions of the tanks have been produced by laying up superimposed, fibrous pads within the above-described assembly of matting forms on a portion of their inner surfaces in the course of assembling the matting forms prior to the step of impregnating with resin. These superimposed fibrous pads were impregnated with resin simultaneously with the cylindrical matting and fiber end pieces so as to become integral parts of the molded tank when the resin had been cured under pressure.

It has been found that any marked discontinuity in the structure of the final product, such as abrupt changes in wall thickness, adversely affects the strength of the product, particularly as regards resistance to fatigue. These deleterious discontinuities in wall thickness and the like have usually been produced in regions of overlapped portions of the fibrous matting material, as for example, longitudinally of the molded tanks disclosed in the above-identified Randolph patent along the inner and outer edges of the laid-up sheet of fiber matting, and circumferentially of the tanks where the ends of the cylindrical matting forms overlapped the fibrous end pieces. One of the reasons for the adverse effect of such overlapped edges of the matting material appears to be that, during the course of molding the tanks, the thinner matting sections are bent over the overlapped edges. It also appears that pressurizing the finished tanks causes similar bending of the molded tank wall to produce cracks and leaks. In any event, the structural discontinuities clearly produce defects which may be termed, "stress risers," that is zones of abnormal stress concentration, since failures of the tanks most often occur in such zones of discontinuities even if there are apparently no appreciable changes in the fiber resin ratio.

Similar defects have occurred where the superimposed pads used to produce thickened wall portions of the tanks formed abrupt changes or discontinuities in the thickness of the assembled fiber forms. In such instances, the superimposed pads occasionally delaminate from one another and from the body of the tank wall and/or the tank walls fractured around the pads. These defects can be attributed to the fact that the thickened wall portions of the tanks are more rigid than the thinner wall portions. As a result, fluctuations of internal tank pressure and resultant flexing of the tank walls concentrate bending stresses in the zones of abrupt changes in thickness around the edges of the pads, causing the pads to pull away from each other and the tank walls and/or the walls to crack around the pads, thereby producing leaks.

In general, the foregoing difficulties are overcome and the improved molded products of the present invention are attained by feathering or beveling the mating edges of the various fibrous shapes so that they blend or merge smoothly into each other to form continuous wall sections without the abrupt structural discontinuities in the molded article previously produced along the zones of juncture of adjacent fiber mats or preforms. More specifically, the end edges of the mats making up the wrapped cylindrical forms are complementarily feathered so that these edges merge smoothly into each other when the form is positioned and compressed against the inner mold casing surface. In a similar manner, the top and bottom or side edges of the mats are feathered to cooperate with correspondingly feathered edges of the preformed fiber end pieces, and all four edges of the rectangular pads used to thicken the side walls of the tanks are feathered so that the edges of the pads blend into each other and into the tank walls.

In addition to eliminating detrimental discontinuities in the structure of the finally molded articles, the feathering of the mating end edges of the mats used to lay up the cylindrical matting form assures that the matting will not be damaged, i.e., the fibers will not be torn and pulled apart, during the fabricating step of expanding and preliminarily compacting the cylindrical, multiple layer matting form against the mold surfaces. This is primarily due to the fact that each of a plurality of superimposed sheets or layers of matting constituting the cylindrical form is wrapped only a single turn around the expandable mandrel, rather than a plurality of turns which formerly required relative slippage of successive overlapped and fiber-interlocked turns during expansion of the form within the mold. As a result, the felted, cylindrical matting form has much less tendency to tear during this expanding step and is more uniformly distributed over the mold surface, and the finally molded article is free from structural irregularities or discontinuities that have heretofore produced zones of high stress concentration in use and consequent premature failures.

Other objects and advantages of the invention will become apparent from the following detailed description and the accompanying drawings:

In the drawings:

FIGURE 7 is a sectional view showing the mats and pads wrapped in cylindrical form around an expandable mandrel, the plane of the section being through the axis of the cylindrical form;

FIGURE 8 is a sectional view taken along the line 8—8 of FIG. 7;

FIGURE 9 is a vertical sectional view similar to FIG. 7 but showing the cylindrical matting form after it has been preliminarily expanded and compacted against the inner surface of a mold casing by the expandable mandrel;

FIGURE 10 is a sectional view taken along the line 10—10 of FIG. 9;

FIGURE 11 is an enlarged, fragmentary view of a portion of the laid-up matting shown in FIG. 9;

Figure 1:
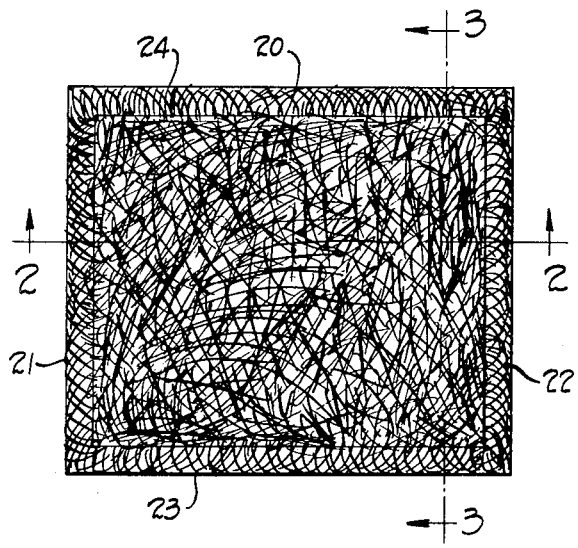
FIGURE 1 is a diagrammatical plan view of a sheet of fibrous matting suitable for laying up a cylindrical matting form.
Figure 3:
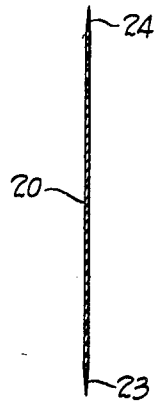
FIGURE 3 is a sectional view taken along the line 3—3 of FIG. 1.
Figure 2:
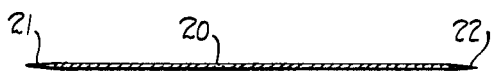
FIGURE 2 is a sectional view taken along the line 2—2 of FIG. 1.

Referring first to FIGS. 1, 2 and 3, there is illustrated a flat sheet of matting 20 of the type preferably employed in carrying out the present invention. This preferred matting sheet consists of randomly distributed, chopped glass fibers of substantially uniform length which are lightly bonded together by suitable low solubility cured binders to form a fibrous, porous mass. Mats of this type are generally well known in the art and are commercially available in rolls of standard widths and mat thicknesses.

Figure 2A:
FIGURE 2a is an enlarged, fragmentary view of a portion of the matting sheet illustrated in FIG. 1.

In accordance with the invention, the opposite end edge portions 21 and 22 of the mat 20 are uniformly feathered or beveled. The formation of these uniformly feathered end edge portions is such that the fiber bulk factor of the mat substantially uniformly decreases from the full mat thickness at the beginning of the feathered portions to their outer edges. As shown most clearly in FIGS. 2 and 2a, the distance over which the feathered portions 21 and 22 taper toward their thin edges is relatively great as compared to the maximum thickness of the mat. For example, a typical matting sheet having a thickness of ⅛ of an inch is formed to have feathered edge portions that taper over a distance of approximately 1½ inches.

The opposite side edge portions 23 and 24 of the mat 20 are also uniformly feathered to correspond to the end edges 21 and 22. Suitable apparatus and method of forming a sheet of matting with uniformly feathered side and end edge portions are set forth in the copending application of Arthur J. Wiltshire et al., Ser. No. 98,617, filed March 27, 1961.

Figure 5:
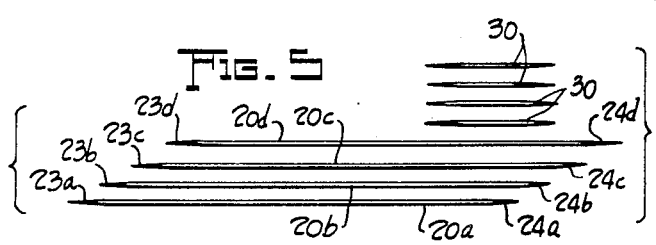
FIGURE 5 is a diagrammatical exploded view illustrating the procedure for assembling a number of fibrous mats and pads preparatory to laying them up in a mold casing.
Figure 6:
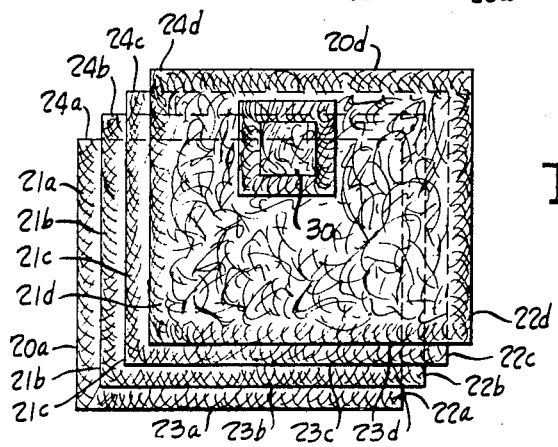
FIGURE 6 is a plan view of an exemplary assembly of fibrous mats and pads assembled as illustrated in FIG. 5.

When fabricating fiber-reinforced plastic tanks, a plurality of the mats 20, designated by reference numerals 20a, b, c and d in FIGS. 5 and 6, are stacked on top of one another so that the end and side edges of each mat are offset in a stepwise fashion from the corresponding edges of the mat below it. The exact number of mats employed will vary depending upon the size of the tank to be produced and the desired wall thickness. For example, four mats of approximately ⅛ inch thickness may be used to manufacture a tank having an eight inch diameter and a wall thickness of approximately .140 inch.

Figure 4:
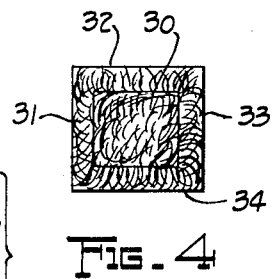
FIGURE 4 is a diagrammatical plan view of a fibrous pad suitable for use in thickening the side wall of the finally molded article.

Having disposed the mats 20a–d in the illustrated manner, a plurality of small, preferably rectangular pads 30 of porous, fibrous material are stacked together and fastened to the upper mat 20d. As noted above, the purpose of these pads is to provide added thickness to the side walls of the tanks where pipe connections are to be made. The stacked pads 30 may be positioned intermediate the end edge 21a of the mat 20a and the opposite end edge 22d of the mat 20d, with one edge of the stack being slightly spaced from the upper side edge 24d of the mat 20d. In accordance with the present invention and as illustrated in FIG. 4, each of the pads 30 is uniformly feathered along all four edge portions 31, 32, 33 and 34 to correspond to the feathered portions of the mats. Suitable apparatus for forming the pads 30 is also set forth in the above-mentioned copending application of Wiltshire et al., Ser. No. 98,617.

The mats 20a–d may be conveniently laid-up into cylindrical form and positioned within a cylindrical mold casing by means of an expandable mandrel 40 shown in FIGS. 7–10. This mandrel 40 is shown to comprise a hollow cylinder or core 41 formed of metal, reinforced plastic, or other suitably rigid material, which is connected to a fluid source (not shown) by a conduit 42. The core 41 is surrounded by a tube 43 of thin, flexible material such as rubber or the like, which is peripherally secured to the core to form an annular, fluid expandable chamber. When fluid is introduced into this chamber via the conduit 42 and the holes 44 in the side wall of the core, the tube 43 is expanded away from the outer surface of the core between its ends.

When using the above-described expandable mandrel 40 to lay up the assembled flat matting sheets 20a–d and position them within the mold casing 50 (FIG. 9), the mandrel is positioned against the mat 20d so that it axially extends between the side edges 23a and 24d of the superimposed matting sheets. The matting sheets are then wrapped around the mandrel slightly more than a single turn with the feathered end edges 21a–d of the mats loosely overlapping the bodies of the mats adjacent their opposite end edges 22a–d, as indicated in FIG. 8.

After the matting sheets have been wrapped around the mandrel 40 in the illustrated manner, the assembly is held together by hand or by weak thread ties (not shown) and a fiber end piece or preform 52, which substantially corresponds to the desired end wall configuration of the finally molded tank, is placed over one end. This fiber preform 52 consists of a lightly bonded, porous mass of chopped glass fibers and is formed to have a feathered peripheral edge 53 which substantially corresponds to the circumferential feathered edge formed by the staggered mat portion 23a–d. The assembly of the cylindrically wrapped matting sheets 20a–d and the fiber preform 52 is then inserted through the open end of the mold casing 40 to place the preform 52 against the inner surface of a removable mold casing cap 51, which was previously secured to the other end of the casing. The casing cap 51 has an inner surface which may be in the shape of an oblate ellipsoid of revolution, a hemishpere, a flat surface, or any other shape adapted to the production of the desired final structure.

Having inserted the assembly of the mandrel and cylindrically wrapped mats 20a–d and preform 52 into the mold casing 50, the mandrel is expanded by introducing fluid into the core of the mandrel and against the inner surface of the flexible tube 43. Referring particularly to FIGS. 9, 10 and 11, it will be seen that expansion of the mandrel acts to expand the cylindrically wrapped mats 20a–d and to firmly compress and position them against the inner surface of the casing. If thread ties are used as mentioned above, they merely break as the wrapped matting form is expanded. The fluid may be then withdrawn from the mandrel to collapse the tube 43, and the mandrel removed through the open end of the mold casing.

As this expansion takes place, the overlapped edges 21a–d and 22a–d are drawn apart until they slide into registry and are juxtapositioned in mating relationship (FIG. 10). In this position, the cooperating feathered edges form a continuous, uninterrupted joint which has substantially the same uniform thickness and bulk factor as the other wall portions of the compacted matting form. In a similar manner, the lower circumferential, feathered edge 23a–d of the matting form is pressed against the correspondingly feathered edge 53 of the fiber preform 52 to form a continuous, uninterrupted, circumferential joint having a substantially uniform thickness and bulk factor.

The expansion of the mandrel 40 also acts to compact the pads 30 against the mats 20a–d so that the feathered edges of the pads gently blend into the side walls of the cylindrical matting form. As will hereinafter be made more apparent, the blending of the edges of the pads into the cylindrical matting form assures a finally molded construction in which deleterious abrupt discontinuities of wall thickness between the pads and the cylindrical walls of the tank are avoided.

Inasmuch as the feathered edges 21a–d and 22a–d slide relative to each other as the wrapped, cylindrical matting form is expanded, it will be apparent that the mats may be laid-up against the inner surface of the mold casing without the danger of pulling apart the glass fibers, as explained more fully in the aforementioned Wiltshire et al. application, Ser. No. 98,617. As a result, the fibers of the mats are uniformly distributed and compacted over the mold surface so that the fiber structure and fiber-resin ratio of the finally molded cylinder will be substantially uniform.

Subsequent to laying up the fiber mats, an elongated, fluid expandable bag 60 having a threaded fluid conduit 63 connected to one end is positioned within the mold casing 50 so that the conduit projects axially outwardly through the open end of the mold. Preferably the bag 60 is encased in a protective sheath (not shown) of suitable material to protect the molding materials against chemical action of vulcanizing agents or residues thereof associated with the bag. A second fiber preform or end piece 62, substantially corresponding to the previously described fiber preform 52, is then positioned around the feathered edges 24a–d of the cylindrical matting form, and the open end of the mold casing is closed by a molding casing cap 61 which is provided with an axial hole 64 through which the conduit 63 extends.

Figures 12, 13:
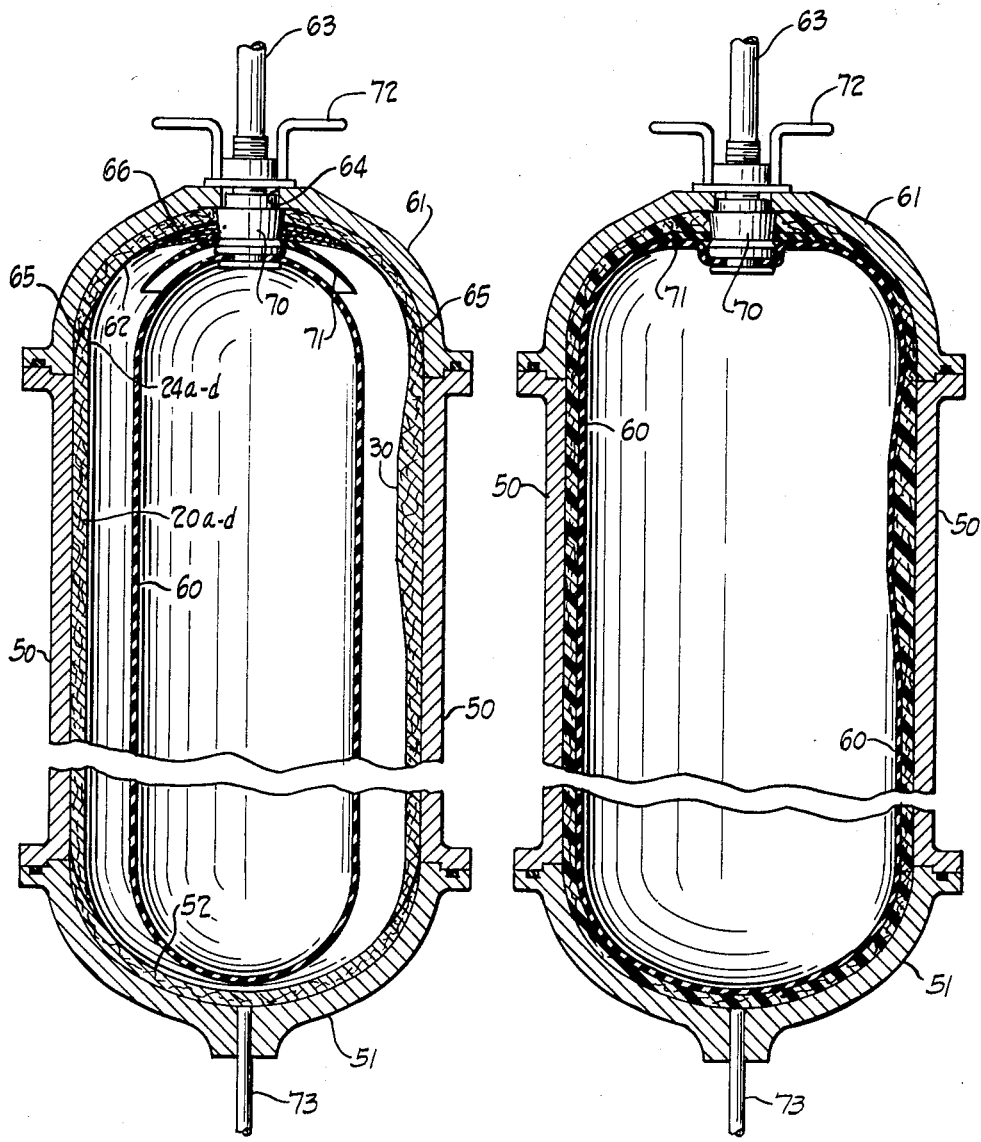
FIGURE 12 is another sectional view through the axis of the closed mold casing of FIG. 9 with the fibrous shapes disposed therein, and illustrates the expandable bag prior to being inflated during the final molding operation.
FIGURE 13 is a view similar to FIG. 12 but showing the mold assembly after the bag has been expanded and the fibrous shapes impregnated with resin.

As shown most clearly in FIG. 12, the peripheral edge 65 of the fiber preform 62 is feathered so that it mates with the circumferential feathered edge 24a–d within the casing cap 61. As distinguished from the preform 52, however, the preform 62 is formed with a hole through its bottom which is adapted to be aligned with the hole 64 in the casing cap 61. In addition, a plurality of stacked fiber washers or rings 66 are positioned against the inner bottom surface of the preform 62 around the hole therein for the purpose of providing an additional thickness to the end wall of the finally molded tank in the region of the hole so that it may be more readily tapped to receive a threaded pipe. It is preferred to employ a set of fiber washers which increase in size away from the inner bottom surface of the fiber preform 62 and to form the washers with feathered peripheral edges. By reason of this construction, the edges of the washers blend into each other and into the curved inner surface of the fiber preform to thereby avoid any structural discontinuities of wall thickness and fiber concentration in the assembled fiber structure.

In accordance with the manufacturing procedures disclosed in the copending application of Ernest E. Geringer, Ser. No. 56,935, filed September 19, 1960, it is preferred first to mount the fiber preform 62 on a metal core 70 which may then be slid over the fluid conduit 63 when assembling the feathered edge of the preform with the cylindrical matting form. The preform 62 and washers 66 are held in assembled position by a rubber cup 71 which is mounted on the core between the bag 60 and the preform. When the bag is subsequently expanded during the molding operation, the cup 71 is pressed against the inner surface of the fiber cap and against the washers 66 to uniformly compact the fibers and thus assure that the molded tank will have a strong end wall. The bag 60 and the assembly of the core 70, the fiber preform 62, and the cup 71 are locked in position by a wing nut 72 which is threaded onto the conduit 63 against the mold casing cap 61.

The molding of the laid-up fiber matting forms is preferably carried out with the mold axis vertical and the end carrying the fluid conduit 63 uppermost. The bag 60 is first inflated with enough pressure to bring it firmly into contact over its entire surface with the inner surfaces of the fiber matting forms. This holds the fiber matting forms against relative shifting while a conventional liquid resin, settable by heat, a catalyst, or the like, is introduced through a supply line 73 in a measured amount. The amount of resin introduced is such that the charge will permeate the entire fiber lining in the mold during the subsequent pressurizing operation, and, preferably, a slight excess of resin is provided so that the rising column of resin in the fiber matting will drive out all the air. The air and then the excess resin are forced out of the mold through ducts (not shown) in the mold casing caps 51 and 61 by gradually increasing the pressure in the bag 60 to a maximum molding pressure required to compress the fiber matting so as to produce a desirable high fiber to resin ratio in the final product.

After the fiber matting forms have been thus impregnated, compacted, and shaped with the mold, and while the shape is maintained by pressure exerted by the bag 60, the ducts in the mold casing caps are closed and the mold casing may be subjected to heat to set the resin. When the resin has set, the conduit 63 of the bag 60 is opened to the atmosphere to permit the bag to collapse. The upper and lower mold casing caps are then removed while pulling the collapsed bag 60 out through the hole which is formed in the upper end wall of the tank. The finished, molded tank may be then slid longitudinally from the mold casing.

Figure 14:
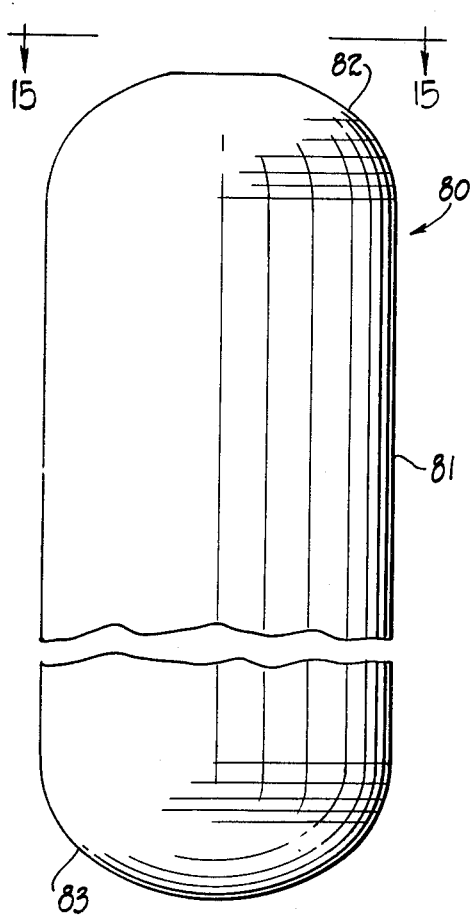
FIGURE 14 is a side elevational view of a pressure tank produced in accordance with the present invention.
Figure 16:
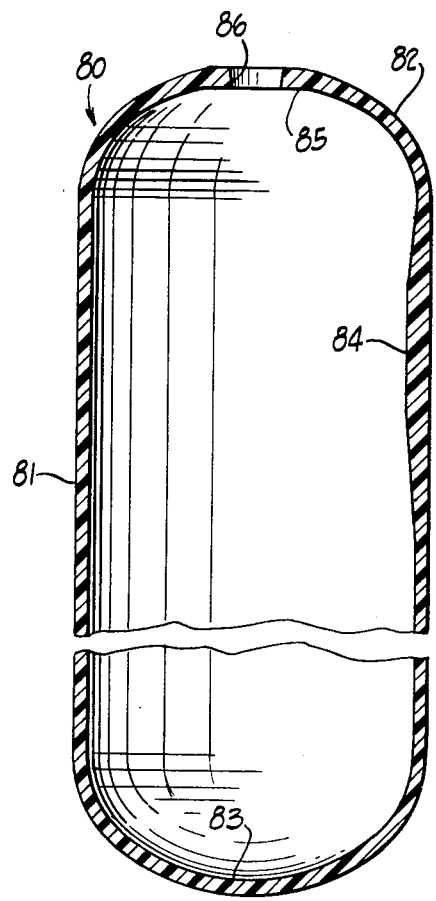
FIGURE 16 is a vertical sectional view of the tank taken along the line 16—16 of FIG. 15.
Figure 15:
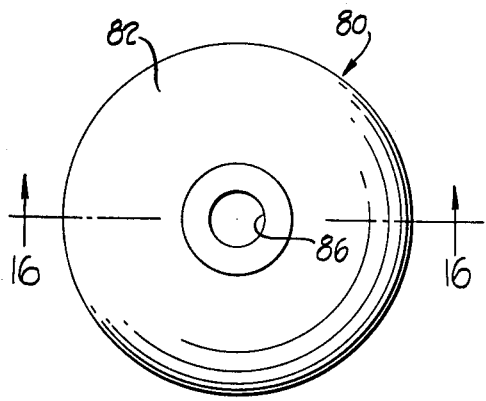
FIGURE 15 is a top plan view taken along the line 15—15 of FIG. 14.

The finally molded tank 80 removed from the mold casing is illustrated in FIGS. 14, 15 and 16. As there shown, the tank has a cylindrical body portion 81 and outwardly convex, generally ellipsoidal, end walls 82 and 83. Referring particularly to FIG. 16, it will be seen that the body portion 81 is of substantially uniform wall thickness except for the relatively small, thickened area 84 formed by the pads 30. As noted above, this thickened area permits the side wall of the tank to be drilled and tapped to form a threaded opening long enough to provide a secure connection with a threaded pipe (not shown). Because of the previously described tapered or feathered edge construction of the pads 30, there is no abrupt increase in thickness of the cylindrical tank wall. Instead, there is a very gradual inward increase in thickness with the edges of the thickened area gently blending into the tank wall. By thus avoiding any abrutp discontinunities in the thickness of the molded wall structure, it has been found that the tank wall will not crack when outwardly flexed by internal pressure and that the pads forming the thickened area will not delaminate therefrom.

It will also be observed from FIG. 16 that there is no evidence of the circumferential seams where the fiber end preforms were mated with the ends of the cylindrical matting form. The absence of any changes in tank wall thickness at such seams, which heretofore has been a cause of leakage and eventual failure of the tanks, results from gradually blending and mating together the feathered edges of the fiber preforms and cylindrical form over a relatively long distance while maintaining a constant total mat thickness across the seams. In addition, the uniform feather which is given to these mating edges results in a uniform distribution and intermingling of the glass fibers so that there are no weak spots or resin-rich areas. For the same reasons, the tank 80 has no discernible longitudinal seam where the feathered end edges of the fiber mats were brought together.

The thickened center portion 85 of the tank end wall 82 around the hole 86 is substantially flat on its outer surface over a substantially area and blends into the curved sides of the end wall to complete a tank structure in which all discontinuities are avoided and which is further characterized by a uniform fiber-resin ratio throughout its walls. The unusually great strength of this improved tank structure has been evidenced by bursting tests in which the tanks have withstood internal pressures exceeding 1200 p.s.i.

It is to be understood that the illustrated tank construction is not limiting of the invention, but that it has been chosen to depict a representaitve application to which the principles of the invention are admirably adapted and to illustrate to those skilled in the art how such principles and teachings may be followed in constructing this and other fiber-reinforced plastic articles. Other modifications and variations of the invention will be apparent to those skilled in the art in view of the foregoing detailed description, and, therefore the invention may be practiced within the scope of the appended claims otherwise than has been specifically disclosed.

What is claimed is:

1. A method of producing fiber-reinforced plastic articles comprising the steps of providing a plurality of porous, fibrous, matting sheets which may be formed in substantially the shape of the article to be produced; uniformly feathering the opposite edges of each of said matting sheets; superimposing said sheets one on another; positioning the superimposed sheets against a generally conforming mold surface while overlapping a feathered edge of each sheet with its own, opposite, feathered edge to form a fiber shape having a substantially uniform bulk factor and wall thickness across the overlapping feathered edges; investing said matting sheets with a settable resin; compacting the formed shape; and setting said resin to thereby produce a seamless article of uniformly high strength.

2. A method of producing fiber-reinforced plastic articles comprising the steps of providing a plurality of porous, fibrous, matting forms which may be formed in substantially the shape of the article to be produced; one of said matting forms comprising a plurality of superimposed matting sheets with each of said sheets having a feathered, mating, edge portion; uniformly feathering mating, edge portions of the other matting forms; positioning corresponding sides of said matting forms against a generally conforming mold surface while placing said mating, feathered edges in overlapping registry; investing said matting forms with a settable resin; compacting the assembled matting forms against said mold surface; and setting said resin to produce a seamless article of uniformly high strength.

3. In the manufacture of impregnated fiber articles, the steps of preforming at least two porous, pliable bodies of loosely matted fibers and uniformly feathering at least one edge portion of each body, positioning one side of said bodies against a generally conforming mold surface with said feathered edge portions of said bodies overlapping one another, forcibly expanding a flexible membrane against the opposite side of said bodies so as to press said overlapping feathered edge portions thereof into mating registry while compressing said bodies against the mold to restrain movement of said bodies relative to each other and to the mold, injecting a settable liquid resin into at least one of said bodies while maintaining the compressing force of said membrane against the bodies, and thereafter increasing the pressure of said membrane against said bodies to further compress the same and the joint therebetween, and maintaining said increased membrane pressure until the resin is set to form a substantially homogeneous, monolithic, resin impregnated article.

4. A method of forming a hollow, fiber-reinforced plastic vessel having a main body section and at least one closed end comprising the steps of feathering separate edge portions of a piece of porous, fibrous matting; forming said piece of matting into the shape of said main body section while placing feathered portions in substantial overlapping registry; providing a fiber preform substantially in the shape of said closed end; forming said fiber preform to have a continuous, feathered edge corresponding to a feathered edge portion of said piece of matting; assembling said fiber preform with its continuous, feathered edge in overlapping registry with said corresponding feathered edge portion of said piece of matting; applying a compacting pressure to said piece of matting and fiber preform and to all of the feathered, overlapping edges; impregnating said piece of matting and said fiber preform with a liquid, settable resin; applying a final progressively increasing compacting pressure to said piece of matting and said fiber preform to cause said resin to uniformly permeate through said matting and said preform; and setting said resin to thereby produce a vessel of high strength.

5. The method claimed in claim 4 including the steps of feathering the edges of a porous, fibrous pad, and positioning said pad against the inner surface of said piece of matting prior to impregnating it with resin so that said vessel is formed with a wall portion of gradually increasing thickness.

6. A method of producing a hollow, fiber-reinforced plastic vessel having a cylindrical body portion and at least one closed end comprising the steps of providing a rectangular sheet of porous, fibrous, matting material; feathering the end edges and at least one side edge of said sheet; forming said sheet into an open-end cylinder by placing one end edge so that it loosely overlaps said sheet adjacent its other end edge and so that said feathered side edge forms a feathered rim at one end of said cylinder; providing a fiber preform substantially corresponding in shape to the closed end of the article to be produced; feathering the peripheral edge of said preform to correspond with the feathered side edge of said sheet of matting material; telescoping said feathered rim of said cylinder within said preform so that said feathered, peripheral edge of said preform overlaps said feathered rim; compacting said cylinder while simultaneously expanding it until said feathered end edges are in overlapping registry; impregnating said cylinder and preform with a liquid settable resin; further compacting said cylinder and preform; and setting said resin to thereby produce a seamless, leakproof vessel of high strength.

7. The method as claimed in claim 6 including the steps of providing a pad of porous, fibrous, matting material; feathering the edges of said pad; and positioning said pad against the inner wall surface of said cylinder prior to compacting it and impregnating it with resin so that said vessel is produced with a side wall portion of gradually increasing thickness.

8. A method of producing a fiber-reinforced plastic vessel having a cylindrical body portion and at least one closed end comprising the steps of providing a plurality of rectangular sheets of porous, fibrous, matting material; feathering the end edges and at least one side edge of each sheet; superimposing said sheets one on another so that the feathered edges of one sheet are offset from the corresponding feathered edges of the sheet immediately below it; forming the superimposed sheets into a cylinder with the feathered end edge of the innermost sheet loosely overlapping the body of the outermost sheet adjacent its opposite feathered end edge and so that said feathered side edges of said sheets cooperate to form a feathered rim at one end of said cylinder; providing a fiber preform substantially corresponding in shape to the closed end of the article to be produced; feathering the peripheral edge of said preform; telescoping said one end of said cylinder into said preform so that the feathered peripheral edge of said preform is in overlapping registry with said feathered rim of said cylinder; compacting said cylinder while simultaneously expanding it until the opposite feathered end edges of each sheet are in substantial overlapping registry; impregnating said cylinder and preform with a liquid, settable resin; further compacting said cylinder and preform and setting said resin to thereby produce a seamless, leakproof vessel of high strength.

9. A strong, leakproof, fiber-reinforced plastic article characterized by an absence of abrupt discontinuities of wall thickess, said article having a hollow body portion and a closed end, said hollow body portion comprising a plurality of superimposed, resin-impregnated sheets of fibrous matting, each of said sheets having uniformly feathered opposite side edges disposed in overlapping registry so that said body portion has a uniform wall thickness, and said closed end comprising a resin-impregnated fibrous structure having edge portions thereof disposed in overlapping registry with edge portions of said body portion, said overlapping edge portions of said structure and body portion being uniformly and correspondingly feathered.

10. An article as claimed in claim 9 wherein the major part of said body portion is of uniform wall thickness and wherein the remaining part of said body portion gradually increases in wall thickness inwardly of said body portion to form a relatively thick wall section.

11. A fibrous body adapted to be impregnated with resin in the production of fiber-reinforced plastic articles comprising a cylinder, said cylinder comprising a plurality of superimposed sheets of porous, fibrous, matting material, each sheet having feathered end edges and at least one feathered side edge, said sheets comprising a cylinder in which one end edge of each sheet overlies the opposite end edge of its sheet and so that said feathered side edge forms a feathered rim at one end of said cylinder, and a fiber preform having a feathered peripheral edge, said end of said cylinder being telescoped within said preform with said feathered peripheral edge being in overlapping registry with said feathered rim.

12. A fibrous body as claimed in claim 11 including a pad of porous, fibrous material positioned against the inner surface of said cylinder, said pad having all its edges uniformly feathered.

References Cited in the file of this patent

UNITED STATES PATENTS

| | | |
|---|---|---|
| 2,406,697 | Lincoln | Aug. 27, 1946 |
| 2,915,425 | Biedebach et al. | Dec. 1, 1959 |
| 2,977,269 | Nerwick | Mar. 28, 1961 |
| 3,095,993 | Balcom et al. | July 2, 1963 |